United States Patent [19]

Huchette

[11] Patent Number: 5,236,718
[45] Date of Patent: Aug. 17, 1993

[54] METHOD FOR FEEDING STEERS AND HEIFERS

[75] Inventor: Michel Huchette, Merville, France

[73] Assignee: Roquette Freres

[21] Appl. No.: 837,610

[22] Filed: Feb. 21, 1992

Related U.S. Application Data

[63] Continuation of Ser. No. 424,099, Oct. 20, 1989, abandoned.

[51] Int. Cl.$^5$ .............................................. A23K 1/00
[52] U.S. Cl. ...................................... 426/2; 426/623; 426/630; 426/807; 514/738
[58] Field of Search ................ 426/2, 623, 630, 636, 426/807; 514/738

[56] References Cited

U.S. PATENT DOCUMENTS 4,598,097 7/1986 Perry et al. .......................... 514/738
4,808,626 2/1989 Friedman et al. ................... 514/738

FOREIGN PATENT DOCUMENTS 0130746 1/1985 European Pat. Off. ............ 514/738
0139055 5/1985 European Pat. Off. ............ 514/738
2159690 12/1985 United Kingdom .

OTHER PUBLICATIONS

Hawley "The Condensed Chemical Dictionary" Van Nostrand Reinhold publishers New York 10th edition p. 960.

Primary Examiner—R. B. Penland
Attorney, Agent, or Firm—Keck, Mahin & Cate

[57] ABSTRACT

Method for controlling the amount of feedstuff ingested by steers and heifers provided with feedstuff ad libitum without decreasing the rate of weight gain. In this method, steers and heifers are fed sorbitol, preferably in an amount of from 10 g to 250 g per day, to control the amount of feedstuff ingested without reducing rate of gain.

8 Claims, No Drawings

METHOD FOR FEEDING STEERS AND HEIFERS

RELATED APPLICATION

This application is a continuation application of Ser. No. 07/424,099 filed on Oct. 20, 1989, now abandoned.

FIELD OF THE INVENTION

The present invention relates to a method for feeding steers and heifers More particularly, the invention relates to a method for controlling consumption of feedstuff by steers provided with the feedstuff ad libitum.

BACKGROUND OF THE INVENTION

In many live-stock farms, steers and heifers are fed by providing the steers with feedstuff ad libitum, i.e., the steers and heifers are offered unrestricted access to the feedstuff In this method of feeding, very large quantities are ingested by the steers and heifers and, for economic reasons, stockmen try to decrease the amount of feedstuff ingested by the steers and heifers per unit of weight gain of the steers and heifers Achieving these objectives with females and castrated animals is particularly important because these animals have a higher tendency toward lipogenesis than non-castrated male animals, particularly when large quantities of feed are ingested Higher lipogenesis reduces energy utilization in fattening of the steers It has been proposed to control the ingested amount of feedstuff by providing the steers with ionophore antibiotics, such as monensin or lasalocid These ionophore antibiotics modify the rate of the fermentations taking place at the level of the rumen of the steers, with the consequence that the production of propionic acid is increased with respect to the production of acetic and butyric acids.

However, the extremely low levels at which the ionophore antibiotics are fed makes their uniform mixing with the feedstuff difficult Further, it is well known that the ingestion of these ionophore antibiotics may have detrimental effects on particular species, thus presenting complications in the plants where both feed for cattle and for these particular species are manufactured.

It has been proposed to complement the feedstuff with adjuvants of the type known as probiotics and isoacids. Unfortunately, the use of these adjuvants does not systematically produce the same effect as that of the present invention Finally, UK Patent Application No. GB 2,159,690 describes the optimization of the assimilation of the feed ration by ruminants by feeding the ruminants an effective amount of sorbitol According to GB 2,159,690, the average daily increase in weight of the animals can be improved when the ruminant is fed sorbitol at the same time as the normal feedstuff ration.

However, none of the prior methods of feeding steers has successfully controlled the amount of feedstuff/ ingested by steers provided with feedstuff ad libitum, without a corresponding decrease in the rate of weight gain of the steers The present Applicant has discovered that the amount of feedstuff ingested by steers and heifers which are offered feedstuff ad libitum is substantially decreased without impairing the rate of weight gain of the steers and heifers by providing the steers and heifers with an effective amount of sorbitol in addition to their normal feedstuff.

Therefore, it is an object of the present invention to provide a method for controlling amount of feedstuff ingested by steers and heifers which are provided with feedstuff ad libitum.

Additional objects and advantages of the present invention will be apparent from the following description and examples.

SUMMARY OF THE INVENTION

The method of the present invention provides a means for controlling consumption of feedstuff by steers and heifers, which steers and heifers are provided with feedstuff ad libitum. According to the invention, steers and heifers are fed an effective consumption controlling amount of sorbitol in addition to their normal feedstuff. This effective amount of sorbitol controls and reduces the amount of feedstuff ingested by steers and heifers without reducing the rate of gain, notwithstanding the fact that the steers and heifers are provided with feedstuff ad libitum.

DETAILED DESCRIPTION OF PREFERRED EMBODIMENTS OF THE INVENTION

According to the method of the invention, steers and heifers are provided with feedstuff ad libitum and are fed sorbitol at a minimum of 10 g per day and at a maximum, for economic reasons, of about 250 g per day. According to a preferred embodiment of the invention, the steers and heifers are provided with an amount of at least 20 g per day and at most about 100 g per day of sorbitol. In an especially preferred embodiment, the steers and heifers are provided with about 50 g per day of sorbitol.

According to one embodiment of the invention, the feeding of sorbitol to the steers and heifers, which may be simultaneous with the feeding of the feedstuff ad libitum, is limited to periods of about 5 days per month. In this embodiment, the sorbitol can be fed to the steers and heifers for about 5 consecutive days each month or can be fed to the steers and heifers on 5 separate days, approximately every 6 days, per month. However, in both cases, the upper limit for the total amount of sorbitol fed to a steer or heifer is 1 kg of sorbitol/month.

According to another embodiment of the invention, the steers and heifers are provided with unlimited quantities of feedstuff to which sorbitol has been mixed in a proportion of from about 0.05% to about 5% by weight of the total diet dry matter, preferably from about 0.1% to 2.0% by weight, and most preferably about 0.5% by weight, based on the total weight of the dry matter in the feedstuff.

The sorbitol useful in the inventive method may be in the form of a powder or a solution. The sorbitol may be pure sorbitol or the sorbitol may be provided in the form of an hydrogenated starch hydrolysate of which sorbitol constitutes the principal component, representing preferably at least 70% by weight based on the dry matter of the hydrolysate.

As indicated above, sorbitol may be provided to the steers and heifers in a mixture with the other constituents of the feedstuff or separately in a particular mixture which is ingested by the steers and heifers at regular intervals in addition to the feedstuff.

The following examples illustrate that steers fed according to the method of the invention ingest substantially decreased amounts of feedstuff, without impairment of the rate of gain and without the resulting carcasses being overfat.

EXAMPLE 1

In this example, two groups of 24 steers each were provided with a feedstuff ad libitum. The feedstuff was a balanced ration consisting of a full-feed of corn silage, corn grain at approximately 1% of body weight and a protein supplement of soybean meal. Vitamin A was added to the protein supplement to provide 24,000 IU per day. All of the steers were administered the anabolic agent zeranol. Block iodized salt was provided throughout the test period.

Group A, the control group, was fed the balanced ration ad libitum. Group B was fed the balanced ration ad libitum with 35 g per day of sorbitol, according to the invention.

The feed consumption of each group was measured daily. Each animal was individually weighed at regular intervals of about 28 to 35 days, and the weight of gain was thereby determined.

The average daily feed consumption for Groups A and B, expressed in kg/day on a wet basis, is shown in Table I.

TABLE I

|  | Group A | Group B |
| --- | --- | --- |
| Corn silage | 15.6 | 13.7 |
| Corn grain | 5.0 | 5.0 |
| Supplement | 0.9 | 0.9 |

Table II summarizes the average weight and feed consumption of the steers of Group A and Group B during the test period. The feed consumption is expressed on a dry matter basis.

TABLE II

|  | Group A | Group B |
| --- | --- | --- |
| Initial weight, average (kg) | 351 | 361 |
| Average quantity (kg) of dry matter feedstuff ingested daily, cumulative for period ending: | | |
| Day 30 | 10.47 | 9.26 |
| Day 57 | 11.25 | 10.05 |
| Day 86 | 11.59 | 10.54 |
| Day 121 | 11.43 | 10.81 |
| Final weight, average (kg) | 485 | 498 |

From the results set forth in Table II, it is apparent that the steers of Group B, which were fed according to the invention, ingested significantly less feedstuff than did the steers of Group A, the control group. More specifically, the steers of Group B ingested 54% by weight less feedstuff while experiencing at least the same percent increase in average steer weight. Throughout the test period, the steers of Group B consistently consumed less feedstuff as compared to the control group steers. In fact, the difference in amounts ingested between the steers of Group A and Group B was 1800 kg dry matter during the test period, which represents a substantial savings in feedstuff.

EXAMPLE 2

The procedure of this example was identical to that of Example 1. A control group of 24 steers, Group A', was fed the feedstuff of Example 1 ad libitum, and a test group of 24 steers, Group B', was fed the feedstuff of Example 1 ad libitum and was also fed 35 g of sorbitol per day.

Table III summarizes the average weight and feed consumption of the steers of Group A' and Group B' during the test period.

TABLE III

|  | Group A' | Group B' |
| --- | --- | --- |
| Initial weight, average (kg) | 310 | 309 |
| Average quantity (kg) of dry matter feedstuff ingested daily, cumulative for period ending: | | |
| Day 29 | 7.77 | 7.21 |
| Day 57 | 8.64 | 7.97 |
| Day 85 | 8.89 | 8.42 |
| Day 113 | 9.17 | 8.75 |
| Day 142 | 9.29 | 8.88 |
| Day 169 | 9.38 | 8.87 |
| Final weight, average (kg) | 511 | 503 |

From the results set forth in Table III, it is apparent that the steers of Group B', which were fed according to the invention, ingested significantly less feedstuff than did the steers of Group A', the control group. More specifically, the steers of Group B' ingested 5.% by weight less feedstuff without experiencing any significant decrease in rate of weight gain. Throughout the test period, the steers of Group B' consumed less feedstuff as compared to the control group steers. The difference in the quantities of feedstuff ingested by Group A' and Group B' amounted to a savings of 2069 kg of feedstuff dry matter.

Although the invention has been described by reference to specific embodiments and examples thereof, it is to be understood that modifications can be made without departing from the scope of the invention as described above and as defined in the claims which follow.

What is claimed is:

1. In a process for feeding steers and/or heifers comprising providing the steers and/or heifers with feedstuff ad libitum, the improvement consisting in complementing the feedstuff provided to the said steers and/or heifers with sorbitol in a proportion within the range from 0.05 to 5% by weight with respect to the feedstuff whereby the amount of feedstuff ingested by the said steers and/or heifers is substantially decreased without impairing their rate of weight gain.

2. A method according to claim 1, wherein the amount of sorbitol provided to the steers and/or heifers is from 10 g to 250 g per day.

3. A method according to claim 2, wherein the sorbitol is fed to the steers and/or heifers during about 5 days per month.

4. A method according to claim 1, wherein the amount of sorbitol provided to the steers and/or heifers is from 20 g to 100 g per day.

5. A method according to claim 1, wherein the amount of sorbitol provided to the steers and/or heifers is about 50 g per day.

6. A method according to claim 1,, wherein the sorbitol is fed to the steers and/or heifers simultaneously with said feedstuff.

7. A method according to claim 1, wherein the sorbitol is provided to the steers and/or heifers by mixing the sorbitol with said feedstuff in an amount of from 0.05% to 5% by weight.

8. A method according to claim 1, wherein the sorbitol is provided to the steers and/or heifers by mixing the sorbitol with said feedstuff in an amount of from 0.1% to 2% by weight.

* * * * *